Sept. 6, 1960 G. DE BROCK 2,951,617
AUTOMATIC PAINT PIGMENT PROPORTIONING AND DISPENSING MACHINE
Filed March 14, 1956 6 Sheets-Sheet 1
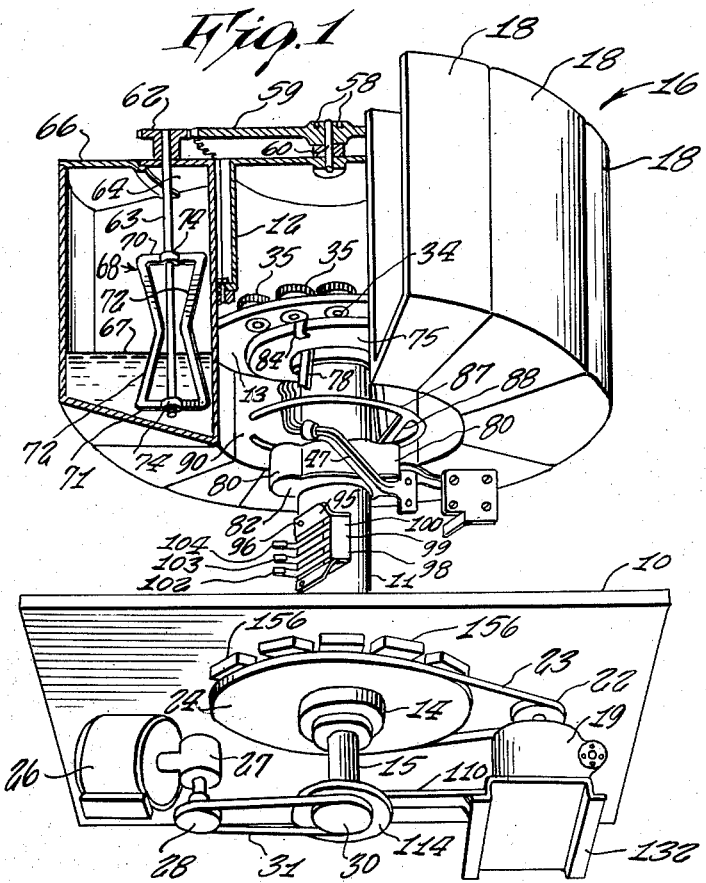
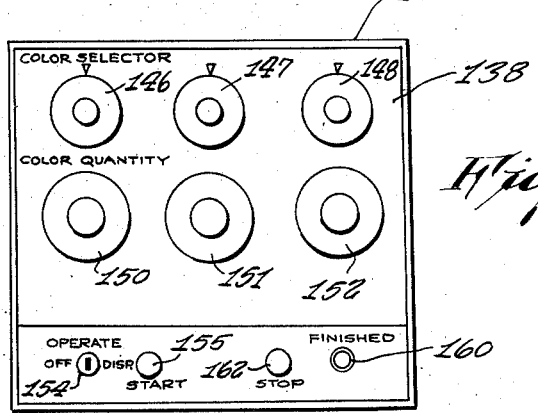
INVENTOR:
GEORGE De BROCK
BY
Richardson, David and Vardon
ATTORNEYS.

Sept. 6, 1960        G. DE BROCK        2,951,617
AUTOMATIC PAINT PIGMENT PROPORTIONING AND DISPENSING MACHINE
Filed March 14, 1956        6 Sheets-Sheet 2
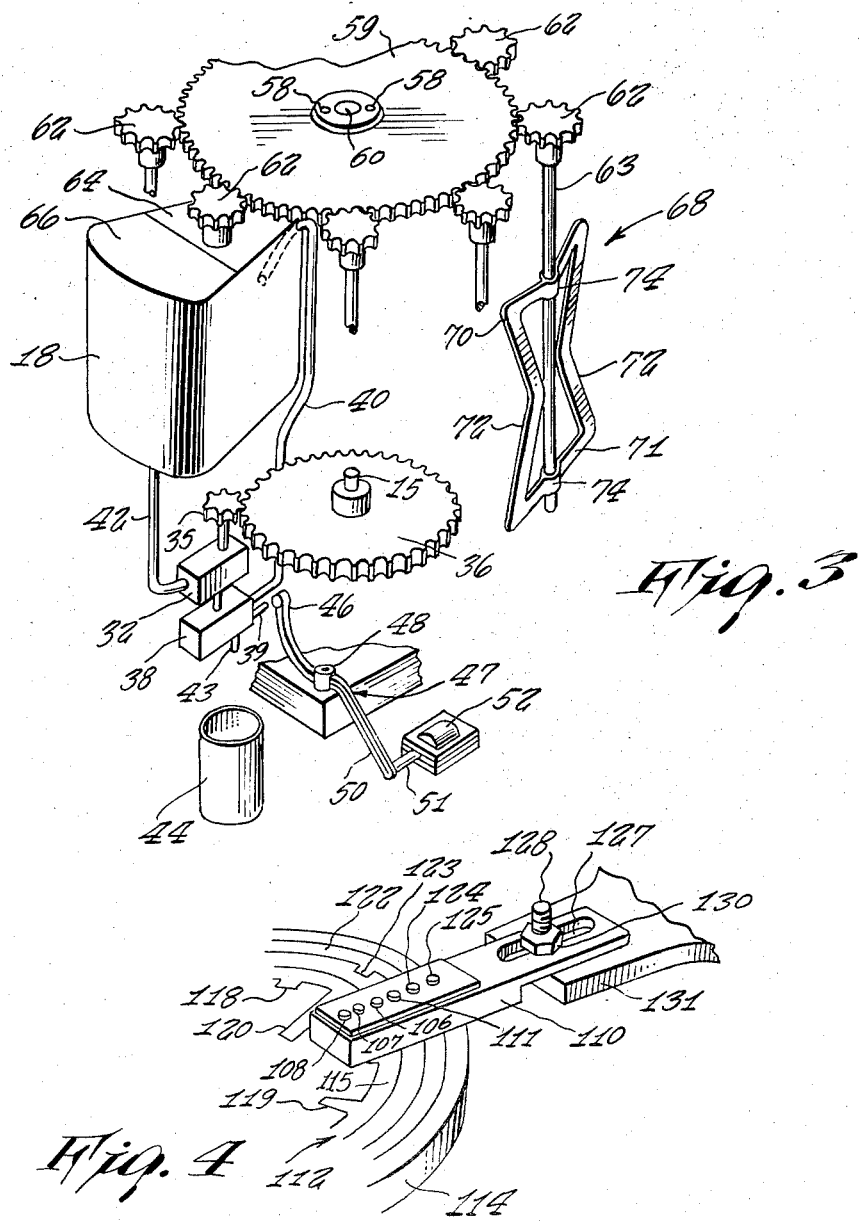
INVENTOR:
GEORGE De BROCK
BY
Richardson, David and Nordon
ATTORNEYS.

INVENTOR.
GEORGE De BROCK
BY
Richardson, David and Nardon
ATTORNEYS.

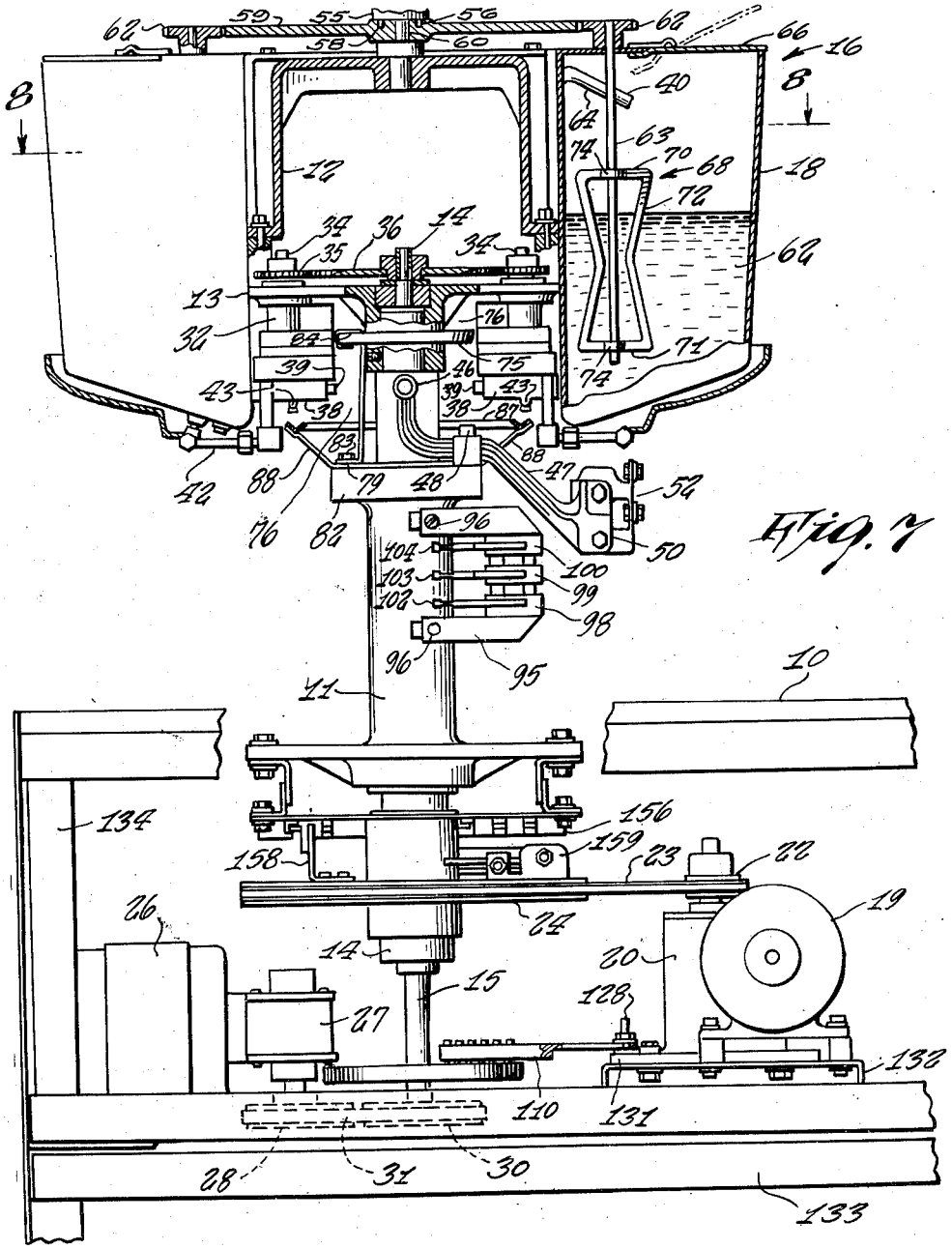

Sept. 6, 1960   G. DE BROCK   2,951,617
AUTOMATIC PAINT PIGMENT PROPORTIONING AND DISPENSING MACHINE
Filed March 14, 1956   6 Sheets-Sheet 5
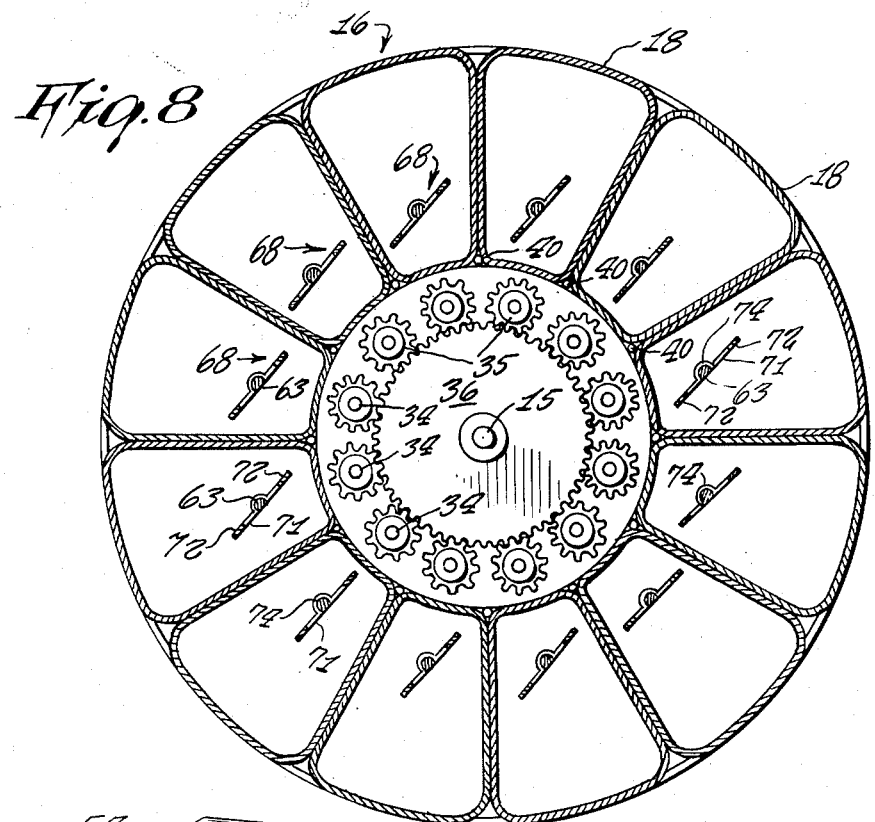
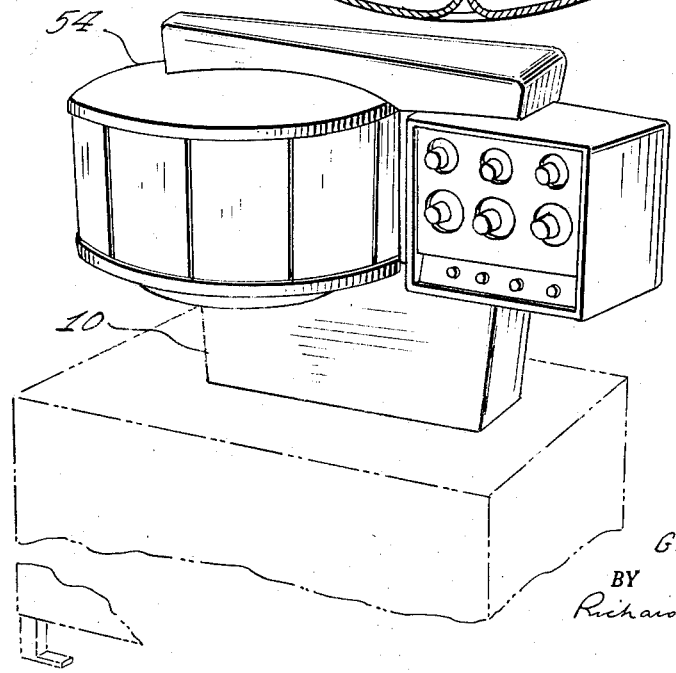
INVENTOR:
GEORGE De BROCK
BY
Richardson, David and Nordon
ATTORNEYS.

Sept. 6, 1960 G. DE BROCK 2,951,617
AUTOMATIC PAINT PIGMENT PROPORTIONING AND DISPENSING MACHINE
Filed March 14, 1956 6 Sheets-Sheet 6

INVENTOR:
GEORGE De BROCK
BY
Richardson, David and Nordon
ATTORNEYS.

United States Patent Office 2,951,617
Patented Sept. 6, 1960

2,951,617

AUTOMATIC PAINT PIGMENT PROPORTIONING AND DISPENSING MACHINE

George De Brock, Cresskill, N.J., assignor to Color Carousel Corp., Staten Island, N.Y., a corporation of California Filed Mar. 14, 1956, Ser. No. 571,486

5 Claims. (Cl. 222—70)

The present invention relates to automatic paint pigment proportioning and dispensing machines and more particularly to certain improvements in such machines. Machines of this type are presently in commercial use and are more fully disclosed in the pending applications of Stewart Stiner et al., Ser. No. 282,652 filed April 16, 1952, now Patent No. 2,787,402 issued on April 2, 1957, and of Milford H. Corbin et al., Ser. No. 388,554 filed October 27, 1953, now Patent No. 2,848,019 issued August 19, 1958.

The improvements which are the subject matter of the present application are concerned with a novel and effective configuration for certain agitator paddles by which the particles of colored paint pigments are maintained continuously suspended in their respective vehicles; the provision of heating means common to all of the pigment reservoirs for limiting the maximum viscosity of the pigment bearing liquids under conditions of low ambient temperature; improved drive means for the agitator paddles; the disposition and arrangement of the control apparatus, and particularly a chassis portion thereof which may provide a mounting for relays, fuses, electron tubes, rectifiers, electrolytic capacitors or similar apparatus requiring inspection and replacement, said chassis being disposed in a convenient and readily accessible location; and the provision of an adjustable holder for the electrical contact brushes which engage the measuring commutator, thereby providing for ready adjustment of the tension in the endless V-belt or drive chain which connects the display and color selection mechanism to the shaft which it drives.

Various objects, additional features and other advantages of the invention will become apparent upon reading the following specification together with the accompanying drawing forming a part hereof.

Referring to the drawing:

Figure 1 is a bottom perspective view of a paint mixing machine embodying the improvements of the present invention, the view being partly broken away to illustrate details of construction.

Figure 2 is a view in front elevation showing the control panel of the paint mixing machine of Fig. 1.

Figure 3 is a diagrammatic perspective view illustrating the arrangement and operation of certain parts of the machine.

Figure 4 is an enlarged perspectve view of an adjustable brush holder in accordance with the invention.

Figure 7 is an elevational view of the machine of Fig. 1, partly broken away and partly shown in section.

Figure 8 is a plan sectional view taken along the line 8—8 of Fig. 7.

Figure 9 is a general perspective view of the machine, on a reduced scale.

Figure 5:
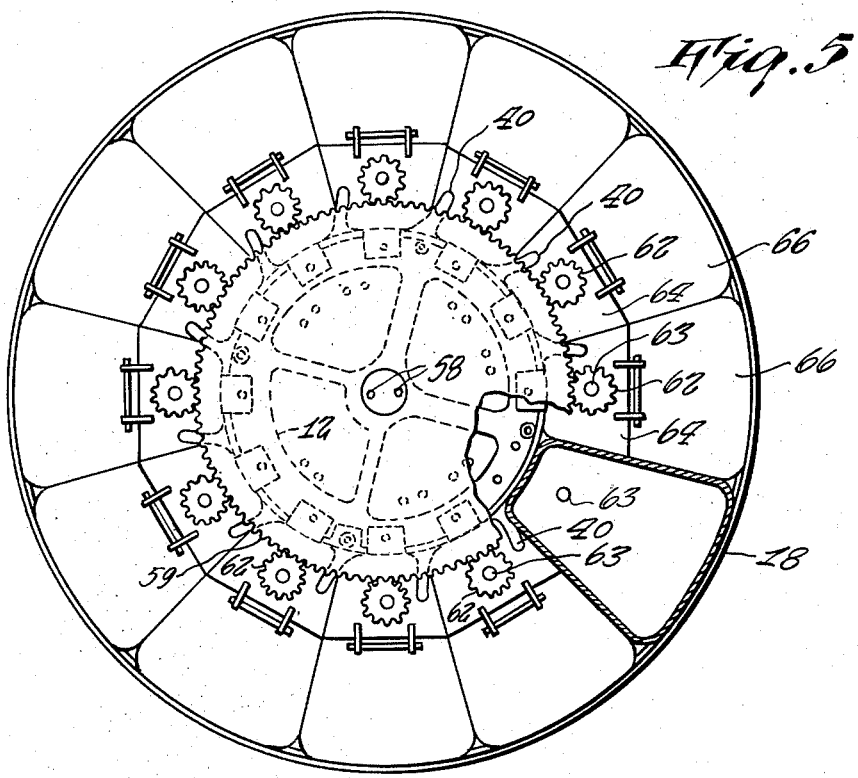
Figure 5 is a top plan view of the revolving reservoir unit of the machine, one of the reservoirs being shown in section.

Referring to Fig. 1, the paint mixing machine comprises a table top 10 which carries a fixed hollow upright supporting column 11. A circular reservoir unit supporting frame 12 including a lower plate 13 is revolubly disposed above the top of column 11 and is fixed to the upper end of a hollow shaft 14 for rotation therewith. An independently revoluble pump drive shaft 15 which is solid, passes through the hollow shaft 14 coaxially therewith. A circular reservoir unit designated generally as 16 includes the supporting frame 12 and comprises, in the example illustrated, a series of twelve individual reservoirs 18 each shaped generally as a segment of an annulus, the series of reservoirs being arranged to form a complete circle.

The reservoir unit 16 is usually maintained in a state of continuous rotation at slow speed for display purposes and also to keep the particles of color pigments in a state of suspension so that they do not settle to the bottoms of their respective reservoirs. For this purpose, a display drive and color selector motor 19 is connected through a speed reducer 20 (Fig. 7) to drive a small pulley 22. The small pulley 22 is connected through a V-belt 23 to drive a larger pulley 24 fixed to the lower end of hollow shaft 14. A pump drive motor 26 is connected through a speed reducer 27 to drive a pulley 28. A driven pulley 30, fixed to the lower end of the solid or pump drive shaft 15 is connected to be driven by pulley 28 through a V-belt 31. It is to be understood that the V-belts 23 and 31 may be replaced by drive chains and the pulleys 22, 24, 28 and 30 by suitable sprockets adapted for engagement with their respective drive chains.

Each of the reservoirs 18 has an individual positive displacement pump, such as a gear pump 32 (Figs. 3 and 7), associated therewith. Each pump is mounted on the under side of lower supporting frame plate 13 and is provided with a drive shaft 34 which extends above the plate 13. Each individual pump drive shaft 34 carries a pinion 35. All of the pinions 35 mesh with a common pump drive gear 36 which is fixed to the upper end of pump drive shaft 15 to be driven by the pump drive motor 26.

Disposed beneath each pump 32 is a three-way dispensing valve 38. Each valve 38 is provided with a spring-pressed actuating or control button 39. Normally all of the buttons 39 are spring-pressed toward the rotational axis of reservoir unit 16 and each valve 38 normally connects the outlet side of its respective pump 32 to a recirculatory return pipe 40. Preferably the recirculatory return pipe 40 is continuous and is of one-piece form-bent construction as indicated in Fig. 3, its upper end being arranged as shown in Fig. 7.

The inlet side of each pump 32 is permanently connected to the bottom of its associated individual reservoir 18 by a short pipe 42. Each valve 38 is provided with a downwardly projecting dispensing pipe or nozzle 43. When the valve button 39 is pressed, the outlet side of the pump 32 is thereby connected to the dispensing pipe 43 so that pigment bearing liquid will be delivered to a container 44 (Fig. 3) instead of to the recirculatory return pipe 40.

When pigments from a preselected one of the reservoirs 18 are to be dispensed into the container 44, the appropriate dispensing pipe 43 is first positioned directly above the container as described below. At the same time, the control button 39 of its associated valve 38 is positioned to be pressed by the upper end 46 of a master valve control lever designated generally as 47. The valve control lever 47 is mounted on a fixed pivot 48 and its lower end 50 is connected to the movable plunger 51 of a dispensing solenoid 52. When solenoid 52 is energized, its plunger is drawn in and the upper end 46 of master valve control lever 47 presses against the control button 39 of the particular valve connected with the preselected reservoir 18 causing liquid to be dispensed from reservoir 18 into container 44 so long as solenoid 52 remains energized. An example of electrical circuitry for the control solenoid 52 is shown and described in Patent No. 2,787,402 and a preferred form for such circuitry is shown in Patent No. 2,848,019, both referred to above.

Figure 10:
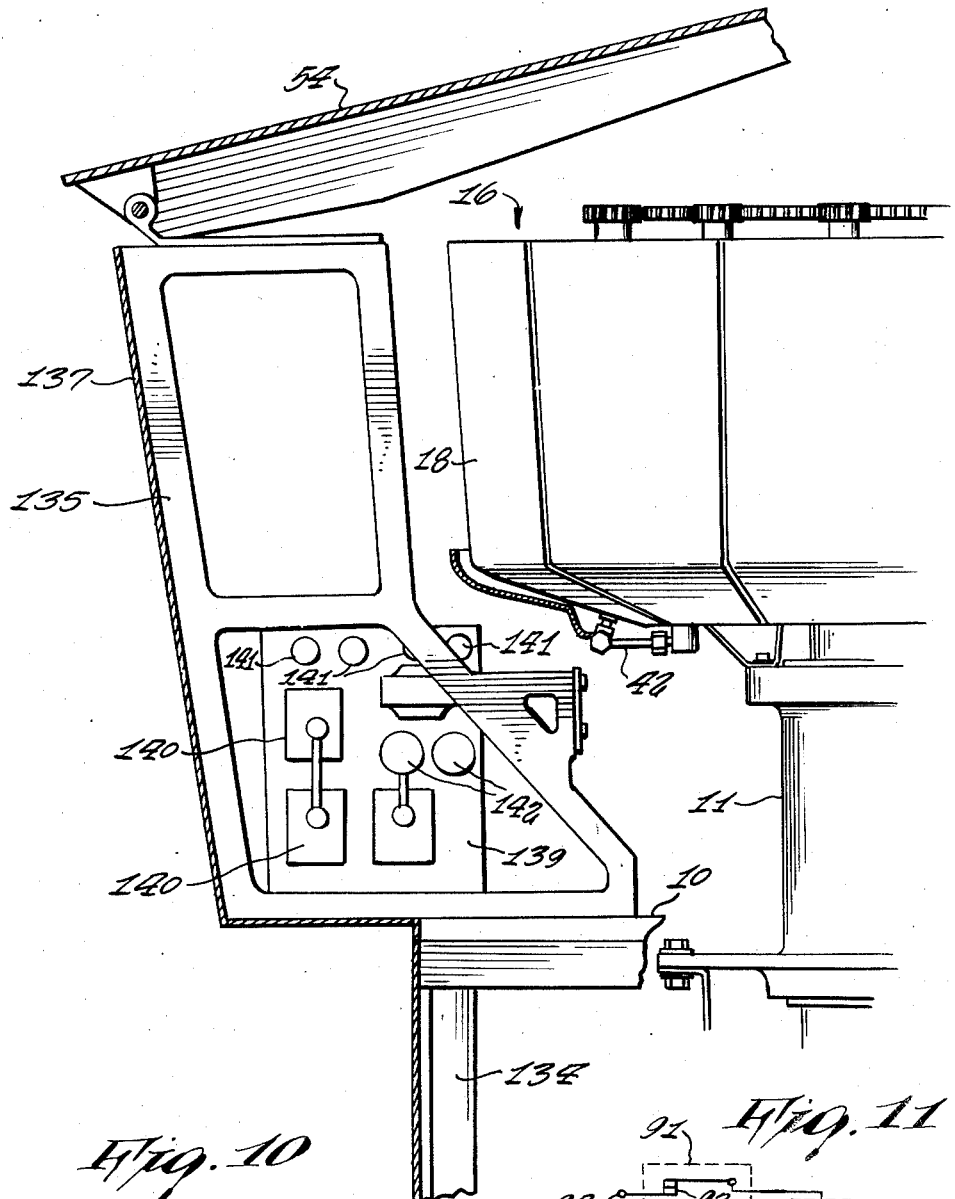
Figure 10 is a fragmentary view in elevation illustrating the location of a chassis for electrical components.

The machine is provided with a hinged top cover 54 (Fig. 9) which is normally lowered to cover the tops of all of the reservoirs 18 of the reservoir unit 16. The cover 54, of which a fragment may be seen in its partially raised position in Fig. 10, may be raised at will for the inspection or filling of the reservoirs 18. The cover 54 carries a central locking member 55 (Fig. 7) which is aligned with the axis of rotation of reservoir unit 16. The member 55 is provided with two downwardly extending pins 56 which engage in diametrically spaced holes 58 formed in a fixed spur gear 59. The gear 59 is revolubly mounted with respect to frame 12 on a short shaft 60 disposed at the top of the frame 12 coaxially with the rotational axis of the reservoir unit 16. Thus, when the cover 54 is in its lowered position, the pins 56 hold gear 59 against rotation while the reservoir unit 16 revolves continuously, being driven by motor 19.

A series of pinions 62 mesh with fixed gear 59, each of the pinions 62 being fixed to the top of a vertical shaft 63 which projects above the top of reservoir 18. Each shaft 63 is journaled in a fixed top cover portion 64 of one of the individual reservoirs 18. The top cover portion 64 only partially closes its associated reservoir 18. A hinged lid 66 completes the closure of each reservoir and may be tilted to the position indicated in dotted lines in Fig. 7 when it is desired to inspect or replenish the liquid contents 67 of any reservoir.

Fixed to the lower portion of each shaft 63 is an agitator paddle 68. The agitator paddle 68 is preferably integrally formed from sheet metal, as by blanking and forming punch press operations. Each paddle 68 comprises an upper crossbar portion 70 and a lower crossbar portion 71 interconnected by spaced vertical knock-kneed leg portions 72. The crossbar portions 70 and 71 are provided with centrally located semicircular bumps 74 of which the inner surfaces engage the shaft 63 and are preferably permanently connected thereto as by spot welding. Except for the bumps 74, each paddle 68 is substantially flat and contains intermediate its opposite faces a plane passing through the axis of shaft 63. It will be seen that during the continuous rotation of reservoir unit 16 by display and selector motor 19, the pinions 62 will roll around the fixed periphery of gear 59 and cause each of the agitator paddles 68 to maintain the liquid contents 67 of its reservoir 18 in a continuous state of agitation. The knock-kneed leg configuration for the paddles 68 has been found to be extremely effective in practice for preventing sedimentation and it offers the additional advantage of low cost of manufacture.

The liquid contents 67 of each reservoir 18 will ordinarily consist of one or more color pigments suspended in a suitable liquid vehicle. In cold weather, and particularly when the room temperature is allowed to drop during the night, the vehicle in which the pigments are suspended may have a tendency to become so viscous that the machine will not operate properly. In order to prevent this condition from arising, a flat annular heater unit 75 (Fig. 6) encircles the supporting column 11 below the lower plate 13 of reservoir unit frame 12 and within an annular space 76 defined between the upper portion of column 11 and the lower portion of reservoir unit 16. Although the annular space 76 is open at its bottom, the air which is heated by the heater 75 will have a tendency to rise within the hollow circular central bottom portion of the reservoir unit 16 and will be trapped by lower plate 13 thus causing it to circulate around the lower portions of the inner surfaces of the individual reservoirs 18. This will heat the lower portion of the liquid contents 62 of each reservoir and convection currents within the liquid will distribute this heat. The amount of heat required to hold the temperature above the point where the viscosity increases to an extent which cannot be tolerated will ordinarily be rather small under the usual operating conditions where the room temperature is always kept above a minimum of 32° Fahrenheit for the protection of plumbing against freezing.

Figure 6:
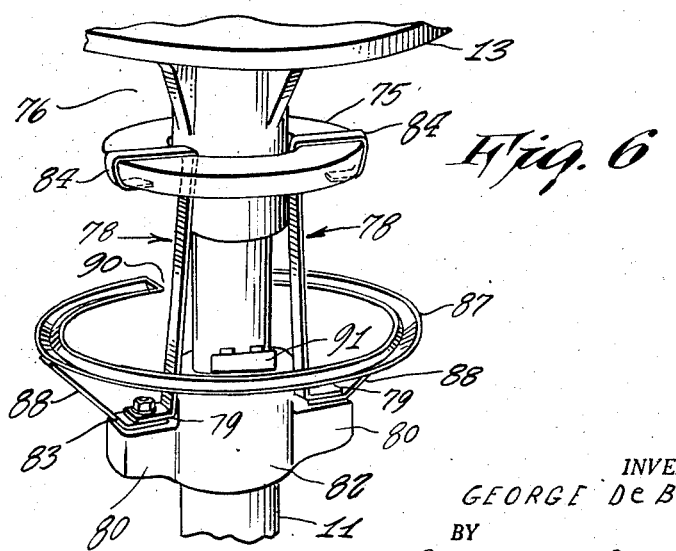
Figure 6 is an enlarged fragmentary perspective view showing an electric heater unit for heating the pigment reservoirs in cold weather.

As shown in Fig. 6, the heater 75 is supported by a pair of substantially vertically extending brackets designated generally as 78. The lower ends 79 of brackets 78 are bent outwardly and are fastened to projecting ears 80 of a supporting collar 82 by bolts 83. Collar 82 is fixedly mounted on column 11. The upper ends 84 of brackets 78 are bent around diametrically opposed portions of heater 75 so that the heater 75 is secured against movement in all directions. The heater 75 itself is of conventional commercially available construction and consists of an electrically insulated resistance wire heating element 86 (Fig. 11) enclosed in a metal casing of flat annular shape, as shown.

Also mounted on ears 80 of collar 82 is a gapped circular drip trough 87 provided with supporting legs 88 which are fastened by bolts 83 along with the lower ends 79 of heater brackets 78. The dispensing pipes 43 which extend downwardly from the several valves 38 are positioned above the drip trough 87, except in the case of the pipe which is positioned above the container 44, the container 44 being located below the gap 90 in drip trough 87.

Figure 11:
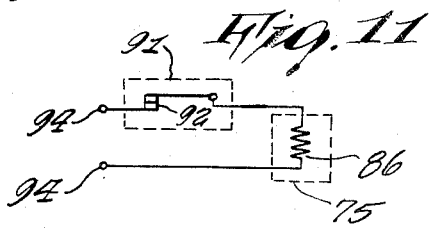
Figure 11 is an electrical circuit diagram of the energizing circuit for the heater shown in Fig. 6.

A thermostat 91 is mounted on column 11 just inside the inner edge of drip trough 87 at the bottom of the annular space 76. As shown in Fig. 11, the thermostat 91 is provided with contacts 92 which are connected in series with the heater element 86 of heater 75. The heater 75 is energized from power supply terminals 94. When the ambient temperature at thermostat 91 reaches a predetermined maximum value, say 75° Fahrenheit, contacts 92 open and heater 75 is shut off. If the room temperature should fall considerably below 70° Fahrenheit, the heater 75 may be energized continuously, provided its heat output is insufficient to bring the air temperature at thermostat 91 to the predetermined shut off valve to open contacts 92.

A bracket 95 is mounted on column 11 by screws 96. A series of three vertically spaced control switches 98, 99 and 100 are carried by bracket 95 and are provided with individual actuating levers 102, 103 and 104, respectively. Only the lowermost actuating lever 102 will be engaged by a container such as 44 when it is placed in dispensing position provided the container is of minimum capacity such as a pint container. A container of the next larger size, one quart for example, will actuate both levers 102 and 103. The largest, say a one gallon container, will actuate all three levers 102, 103 and 104 simultaneously. The switch contacts include transfer contacts which are interconnected to establish connection with a particular one of three contact brushes 106, 107 and 108 (Fig. 4), respectively, mounted on a brush holder member 110. The particular brush is thus selected in accordance with the capacity of the particular container 44 which is then in dispensing position. The circular established by the switches 98, 99 and 100 extends through a common brush 111. As shown in Fig. 4, these brushes engage a circular commutator member 112 carried by a flat supporting disc 114 fixed to pump drive shaft 15. The commutator member 112 comprises a continuous peripheral portion 115 which is engaged by the common brush 111. It also comprises radially inwardly extending leg portions of different lengths 118, 119 and 120. There is a single leg portion 120 of maximum length, three of intermediate length 119 and four of minimum length 118. Brush 106 engages every one of the leg portions 118, 119, 120 and is associated with a minimum or pint size container. Brush 106 thus closes a circuit to brush 111 eight times during each revolution of pump drive shaft 15. Brush 107 engages only the leg portions of intermediate length 119 and the longest leg portion 120, thus closing a circuit to brush 111 four times during each revolution of pump drive shaft 15. Brush 107 is associated with the intermediate or quart size container. The brush 108 engages only the longest leg portion 120 and closes a circuit to brush 111 only once during each complete revolution of pump drive shaft 15. Brush 108 is associated with the largest size or one gallon container.

As explained in greater detail in Patent No. 2,848,019, these brushes control the operation of counting apparatus which controls the energization of dispensing solenoid 52. The commencement of solenoid energization and the beginning of the first count of the counting operation are both determined by another commutator member 122 provided with a short synchronizing leg portion 123. A circuit is established between two further brushes 124 and 125 once during each revolution by synchronizing leg portion 123. Synchronizing leg portion 123 is in radial alignment with the longest leg portion 120 of commutator member 112. This assures that the dispensing and counting operations will always commence at the same angular position of pump drive shaft 15, regardless of the size of the particular container which is actuating at least one of the switches 98, 99, 100.

From the foregoing, it will be appreciated that the correct positioning of brush holder 110 is of critical importance to the correct operation of the paint mixing machine. Brush holder 110 has an elongated slot 127 formed in one end and this slot receives a bolt 128 which is longitudinally slidable therein. The position of bolt 128 in slot 127 may be locked by tightening a nut 130. Bolt 128 is fixed to the base 131 of speed reducer 20 (Fig. 7). Speed reducer 20 and display and selector motor 19 are both mounted on a common supporting base 132 which, in turn, is adjustably mounted on lower supporting frame 133 of the machine to permit adjustment of the tension in belt or chain 23. When the common base 132 is moved to vary the tension in belt 23, the nut 130 may be loosened and the brush holder 110 conveniently readjusted to its correct position. The position of brush holder 110 may also be checked and readjusted independently of the tension in belt 23, whenever required.

The machine comprises an upper framework 135 (Fig. 10) to which the hinged cover 54 is secured. A control cabinet 136 is mounted in the upper portion of framework 135. Removable enclosing panels 137 mounted on framework 133, 135 give a finished and attractive appearance to the machine. Cabinet 136 is provided at its front with a control panel 138 (Fig. 2), later to be described. Disposed in upper framework 135 below control cabinet 136 and enclosed by panels 137 is a chassis 139 (Fig. 10) on which there are illustratively shown mounted three dry disc type rectifiers 140 and two electrolytic capacitors 142 which provide sources of direct current for operation of motor 19 and operation of the counting apparatus controlled by the brushes in brush holder 110. Fuses 141 are also mounted on chassis 139. The chassis 139 is thus mounted in a conveniently accessible portion of the machine.

The control panel 136 is provided with three independently adjustable color selection switches 146, 147, 148. Associated with each color switch is quantity selection switch 150, 151, 152 for determining the quantity which is to be dispensed of the particular color selected by its associated color selector switch. Any one of the reservoirs 18 may be selected by any of the color selector switches 146, 147, 148. By reference to a chart or table with color samples, the individual colors to be mixed and the quantities of each component are determined. Switches 146, 147, 148 are positioned accordingly. The appropriate quantity settings are then established on the quantity selectors 150, 151, 152. It should be noted in this connection that the number of actual revolutions of pump drive shaft 15 is automatically arranged in accordance with the size of the container by container switches 98, 99, 100 described above.

A control switch 154 is normally in its "Display" position in which motor 19 runs continuously, thereby slowly revolving the reservoir unit 16 with pump motor 26 stopped. Under these conditions, the agitator paddles 68 are continuously revolving. In addition, the common pump drive gear 36 is held stationary and the individual pump pinions 35 roll around its periphery slowly operating all of the pumps 32 and continuously recirculating the liquid in each of the reservoirs 18.

Before setting up the desired color and quantity switches, the control switch 154 is turned from its "Display" position to its "Dispense" position. This starts the pump motor 26 and pump drive shaft 15 turns the common pump gear 36 so that the pumps 32 are all driven at relatively high speed. This further agitates the pigments by accelerated recirculation. A "Start" button 155 is then pressed. This initiates the dispensing operation.

A ring of position selecting switches 156 is arranged above pulley 24. Pulley 24 carries a hunting finger 158 on its upper side which successively operates each switch 156. After the "Start" button 155 has been pressed, the hunting finger 158 moves until it finds the particular switch corresponding to the color selected by color selecting switch 146. When this happens, display and selector motor 19, which is a direct current motor, is stopped by dynamic braking so that the particular reservoir 18 which contains the preselected color is correctly located in dispensing position. The valve 38 associated with the preselected reservoir is then positioned with the dispensing pipe 43 directly above the container 44 and its control button 39 ready for actuation by master valve control lever 47. A buffer 159 (Fig. 7) may interconnect pulley 24 and hollow shaft 14 to absorb the shock incident to the abrupt stoppage caused by the dynamic braking of motor 19. This buffer may comprise an arm and spring as shown in greater detail in Patent No. 2,848,019, or other buffer means may be used.

After the desired reservoir has been placed in dispensing position, solenoid 52 is energized and liquid is pumped out through dispensing pipe 43 under control of its valve 38. Counting mechanisms are operated under control of the brushes in brush holder 110 until pump drive shaft 15 has made a predetermined number of complete revolutions, quarter revolutions or ⅛ revolutions, depending upon the size of the container. When this has occurred, solenoid 52 is deenergized and dispensing ceases. The display motor 19 resumes its operation until the next selected color reservoir is in dispensing position and the counting operation is repeated. When all three colors have been dispensed in the selected quantities or proportions, a lamp 160 is lighted indicating that the dispensing is completed. This may be accompanied by the sounding of an audible signal, if desired. It should be understood that each color selector or quantity selector or both will have a zero position so that the dispensing operation will be indicated to be complete with a minimum of delay by skipping such switch entirely for counting and reservoir positioning purposes when it is in its zero position. An emergency stop button 162 is provided to stop dispensing operation of the machine at any time.

It will be apparent to those skilled in the art that changes and modifications may be made in the specific embodiments of the invention herein shown and described without departing from the spirit and scope of the invention as defined in the appended claims.

What is claimed is:

1. In combination with a revoluble reservoir unit comprising a plurality of circularly arranged liquid containing reservoirs, and means for continuously revolving said unit about a vertical axis, the provision of a plurality of agitator members each disposed in one of said reservoirs; a vertical shaft upon which each agitator member is carried; a pinion fixed to the upper end of each shaft; and a fixed gear coaxial with the rotational axis of said unit, said fixed gear meshing with all of said pinions for simultaneously driving said agitator members.

2. In combination with a revoluble reservoir unit comprising a series of individual liquid containing reservoirs arranged in a circle around a vertical axis, a supporting frame upon which said reservoirs are carried, said frame being revoluble about said axis, and means for driving said frame, the provision of a vertical shaft in each reservoir extending from beneath the surface of said liquid to above the top of said reservoir; an agitator paddle fixed to the lower portion of each shaft and immersed in said liquid; a separate drive pinion carried by the upper end portion of each of said shafts for rotating each paddle; and a fixed gear meshing with all of said drive pinions.

3. In combination with a revoluble reservoir unit comprising a series of individual liquid containing reservoirs arranged in a circle around a vertical axis, a supporting frame upon which said reservoirs are carried, said frame being revoluble about said axis, and means for driving said frame, the provision of a vertical shaft in each reservoir extending from beneath the surface of said liquid to above the top of said reservoir; an agitator paddle fixed to the lower portion of each shaft and immersed in said liquid; a separate drive pinion carried by the upper end portion of each of said shafts for rotating each paddle; a fixed gear revolubly carried by said reservoir supporting frame coaxially therewith; a cover member adapted to cover the tops of all of said reservoirs; hinged supporting means for said cover member whereby said cover member may selectively be raised for access to said reservoirs or be lowered to cover the same; and locking means carried by said cover supporting means and engageable with said fixed gear when said cover is lowered, said locking means being held against rotation about the rotational axis of said reservoir supporting frame by said cover supporting means and holding said gear against rotation when in engagement therewith.

4. The combination according to claim 3, in which said fixed gear has a pair of diametrically opposed vertically extending holes formed in the upper side thereof, and wherein said locking means comprises a pair of pins engageable in said holes when said cover member is lowered.

5. In combination with a paint mixing machine which comprises a frame, a series of individual liquid containing reservoirs arranged in a circle around a vertical axis, a motor and speed reducer carried by said frame, common supporting means for said motor and speed reducer, a supporting frame for said reservoirs revoluble about said axis, means including elongated flexible endless drive means connecting said reservoir supporting frame to said speed reducer for rotating said reservoirs, said common motor and speed reducer supporting means being adjustably mounted on said machine frame for adjustment of the tension in said endless drive means, an individual dispensing pump for each reservoir carried by said reservoir supporting frame, common pump drive means including a vertical shaft, individual valve means for controlling dispensing operation of each of said pumps, counting means including master valve control means for initiating and terminating operation of a predetermined one of said valve means, and a flat disc shaped commutator carried by said shaft and driven with said pumps, the provision of: a brush holder extending over said commutator, said brush holder being adjustably connected to said common motor and speed reducer supporting means to vary the position of said brush holder with respect to said commutator means independently of said tension in said endless drive means, and a plurality of brushes carried by said brush holder and connected to control operation of said counting means.

References Cited in the file of this patent

UNITED STATES PATENTS

| | | |
|---|---|---|
| 614,000 | Hutchinson et al. | Nov. 8, 1898 |
| 644,257 | Mulloy | Feb. 27, 1900 |
| 1,215,214 | Stewart | Feb. 6, 1917 |
| 1,351,921 | Mendal | Sept. 7, 1920 |
| 1,374,843 | Flaherty | Apr. 12, 1921 |
| 1,430,935 | Bright | Oct. 3, 1922 |
| 1,456,238 | Ivancic | May 22, 1923 |
| 1,813,183 | Mathewson | July 7, 1931 |
| 1,898,619 | Dare | Feb. 21, 1933 |
| 2,094,702 | Hexter | Oct. 5, 1937 |
| 2,659,563 | Saxe | Nov. 17, 1953 |
| 2,660,340 | Thompson | Nov. 24, 1953 |
| 2,660,351 | Thompson | Nov. 24, 1953 |

FOREIGN PATENTS

| | | |
|---|---|---|
| 767,280 | Great Britain | Jan. 30, 1957 |